US012478120B2

(12) United States Patent
Otaki et al.

(10) Patent No.: US 12,478,120 B2
(45) Date of Patent: Nov. 25, 2025

(54) SOUND COLLECTING DEVICE

(71) Applicant: Sony Group Corporation, Tokyo (JP)

(72) Inventors: Hisayoshi Otaki, Tokyo (JP); Noriaki Fujita, Tokyo (JP)

(73) Assignee: Sony Group Corporation, Tokyo (JP)

(*) Notice: Subject to any disclaimer, the term of this patent is extended or adjusted under 35 U.S.C. 154(b) by 969 days.

(21) Appl. No.: 17/590,823

(22) Filed: Feb. 2, 2022

(65) Prior Publication Data

US 2022/0295921 A1 Sep. 22, 2022

(30) Foreign Application Priority Data

Mar. 19, 2021 (JP) ................................ 2021-046258

(51) Int. Cl.
*A41D 13/11* (2006.01)
*H04R 1/02* (2006.01)
*H04R 1/10* (2006.01)

(52) U.S. Cl.
CPC ......... *A41D 13/1161* (2013.01); *H04R 1/025* (2013.01); *H04R 1/1016* (2013.01)

(58) Field of Classification Search
CPC ................ A41D 13/11; A41D 13/1161; H04R 2225/61; A62B 18/02; A62B 23/02
See application file for complete search history.

(56) References Cited

U.S. PATENT DOCUMENTS 3,227,836 A * 1/1966 Renwick, Sr. ......... H01H 13/08 351/158
4,955,729 A * 9/1990 Marx .................. H04R 25/453 381/322
9,606,375 B2 * 3/2017 Abreu ...................... G02C 5/14
10,782,708 B2 * 9/2020 Togliatti .............. A61M 16/022
10,814,086 B2 * 10/2020 Mashal ............. A61M 16/0616
2006/0045304 A1 * 3/2006 Lee ...................... H04R 1/1041 381/384
2011/0091058 A1 * 4/2011 Sacha ..................... G06F 3/017 381/328
2015/0020815 A1 * 1/2015 Gabriel ............. A41D 13/1161 128/863

FOREIGN PATENT DOCUMENTS

| | | | | | |
|---|---|---|---|---|---|
| EP | 3797618 | A1 | * | 3/2021 | ............. A41D 1/005 |
| JP | 2017-38249 | A | | 2/2017 | |
| JP | 2017038248 | A | | 2/2017 | |
| JP | 2017038249 | A | | 2/2017 | |
| JP | 2017069762 | A | | 4/2017 | |
| JP | 3213065 | U | | 10/2017 | |
| JP | 2018112662 | A | * | 7/2018 | |
| JP | 3222399 | U | | 8/2019 | |
| KR | 20200148149 | A | * | 11/2020 | |

OTHER PUBLICATIONS

JP 2018112662 translated (Year: 2018).*
KR 102389143 translated (Year: 2022).*

* cited by examiner

*Primary Examiner* — Brandy S Lee
*Assistant Examiner* — Mishal Zahra Hussain
(74) *Attorney, Agent, or Firm* — XSENSUS LLP

(57) ABSTRACT

A sound collecting device includes: a main body including a sound collector inside of the main body, the sound collector being mounted in a gap between a helix and a temporal region, a string locking portion; and a transmitter configured to transmit sound information generated by the main body.

20 Claims, 5 Drawing Sheets

SOUND COLLECTING DEVICE

CROSS-REFERENCE TO RELATED APPLICATION

This application claims priority from Japanese Application No. 2021-046258, filed on Mar. 19, 2021, the contents of which are incorporated by reference herein in its entirety.

BACKGROUND

The present disclosure relates to a sound collecting device.

In recent years, wearing of a mask tends to increase from the viewpoint of infection prevention, countermeasures against pollinosis, and the like. A mask is generally worn by an ear hooking method using an elastic string or the like, but ears may be damaged by wearing the mask for a long time. For preventing inflammation by an ear hook such as an elastic string, the ear hook is fixed with a connecting member at the back of the head at a position shifted from the ear, and there are disclosed a technique of sandwiching the face with an elastic mask holder to attach the mask holder to the face, and then locking an elastic string or the like to the mask holder (see, for example, Japanese Utility Model Registration No. 3213065) and a technique of providing a groove or the like for holding a mask string in an ear holder of a frame for fixing a projection display unit in front of the eyes (see, for example, JP 2017-38249 A).

SUMMARY

On the other hand, when a sound collecting device to be worn on an ear (or ears) such as a hearing aid and a mask are simultaneously worn, it is considered that not only the risk of inflammation due to wearing the mask increases, but also an elastic string affects sound collection performance of the hearing aid. However, in the related art, no consideration has been given to the influence on the ear(s) when the sound collecting device and the mask are used in combination and to noise mixing due to movement of the elastic string.

According to one aspect of the present disclosure, there is provided a sound collecting device including: a main body including a sound collector inside of the main body, the sound collector being mounted in a gap between a helix and a temporal region, a string locking portion; and a transmitter configured to transmit sound information generated by the main body.

DETAILED DESCRIPTION

Figure 1:
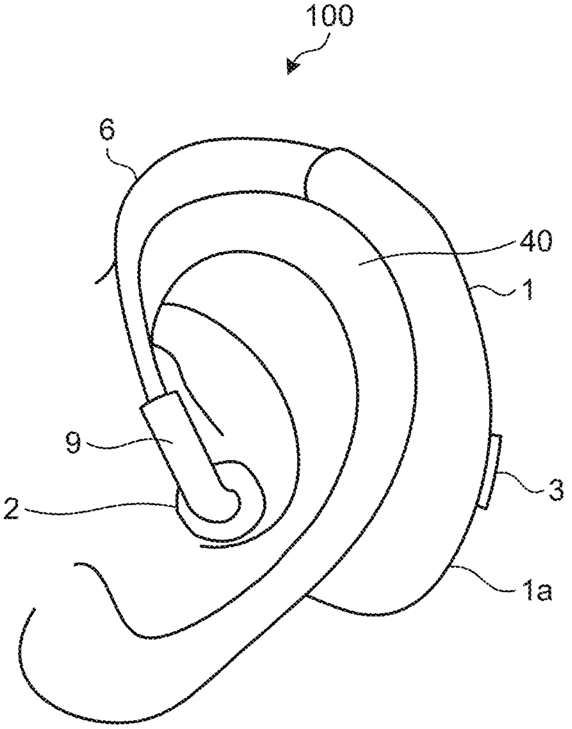
FIG. 1 is a view illustrating a schematic configuration of a sound collecting device according to a first embodiment.

Hereinafter, embodiments for carrying out the present disclosure will be described in detail with reference to the drawings. The present disclosure is not limited to the following embodiments. In addition, each of the figures referred to in the following description merely schematically illustrates the shape, size, and positional relationship to the extent that the contents of the present disclosure may be understood. That is, the present disclosure is not limited to the shape, size, and positional relationship exemplified in each figure. Moreover, in the description of the drawings, the same parts will be described with the same reference numerals.

First Embodiment

FIG. 1 is a view illustrating a schematic configuration of a sound collecting device 100 according to a first embodiment. The sound collecting device 100 in the present disclosure includes, for example, a hearing aid (air conduction hearing aid or bone conduction hearing aid), a sound collector, a headphone, and the like. The sound collecting device 100 illustrated in FIG. 1 is an ear hooking type hearing aid and includes a main body 1 having a microphone portion therein and mounted in a gap between a helix 40 and a temporal region 50 (see FIG. 3), and a transmission unit that transmits sound information generated (amplified) by the main body 1. The transmission unit is, for example, an ear plug portion 2 (earpiece) inserted into an ear canal in the first embodiment. The main body 1 and the ear plug portion 2 are connected by a tube 6 or an electric wire, and sound is output from a receiver 9. The sound collecting device 100 is used as a pair of left and right sound collecting devices and is constantly worn, but may be of a type that may be worn on one of the ears. Moreover, in a case where the sound collecting device 100 is of a type that transmits sound by bone conduction, the transmission unit is a sound wave generator that transmits sound amplified by the main body 1 by vibrating the bone, and the transmission unit is mounted on the head (for example, ear peripheral portion) of the user.

In the sound collecting device 100, an amplifier, a power supply, and an output unit are built in the main body 1 in addition to a sound collecting unit. The main body 1 includes an operating unit 3, a string locking portion 4, and a slit hole 8 on a back surface 1$a$ that does not come into contact with a human body, that is, the helix 40 and the temporal region 50 when the main body 1 is worn. The sound collecting unit is built in a lower portion of the slit hole 8. The operating unit 3 adjusts output, changes environmental characteristics such as indoor and outdoor, and switches sound output when a mask 20 is worn or not worn.

Figure 2A:
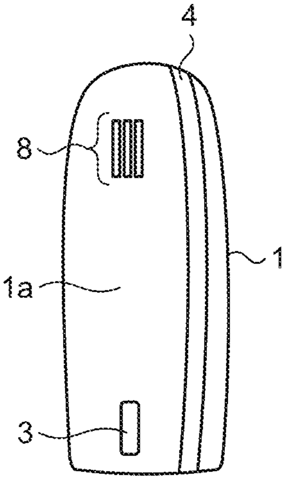
FIG. 2A is a rear view and FIG. 2B is a bottom view of a main body of the sound collecting device according to the first embodiment.
Figure 2B:
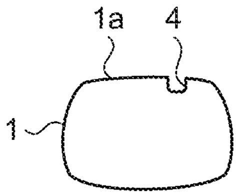
Figure 3:
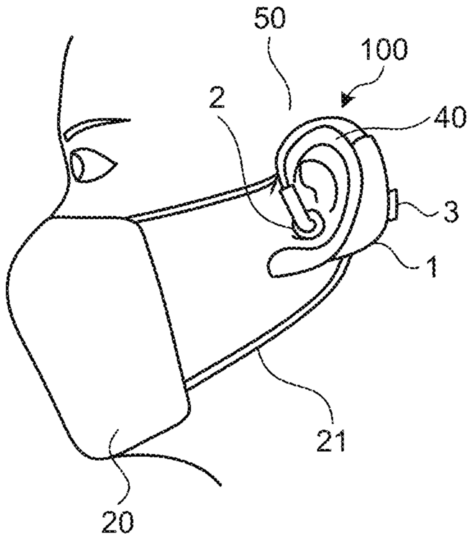
FIG. 3 is a view when the sound collecting device and the mask according to the first embodiment are simultaneously worn.

FIG. 2A is a rear view and FIG. 2B is a bottom view of the main body of the sound collecting device according to the first embodiment. The string locking portion 4 is a groove provided on the back surface 1*a* of the main body 1. As illustrated in FIG. 2A, the string locking portion 4 is provided from an upper portion to a lower portion of the back surface 1*a* of the main body 1. FIG. 3 is a view when the sound collecting device and the mask according to the first embodiment are simultaneously worn. By locking a string 21 of the mask 20 to the groove which is the string locking portion 4 of the main body 1, it is possible to prevent inflammation of the ear due to constant wearing of the mask 20. In the main body 1, the string 21 of the mask 20 may be locked without changing the usability by providing the string locking portion 4 in the main body 1 having the same size as that used in the related art.

Moreover, the string locking portion 4 is preferably disposed at a position where it is difficult to affect sound collection performance of the sound collecting unit, for example, on a side of the temporal region 50 of the back surface 1*a* of the main body 1. When the mask 20 is worn, a force is applied toward the center of the face. When the string locking portion 4 is closer to the helix 40 than the center, the string 21 of the mask 20 moves to the center side of the face, that is, the temporal region 50 side, and the string 21 straddles the vicinity of the slit hole 8 of the sound collecting unit and noise may be mixed in or the slit hole 8 may be blocked. By providing the string locking portion 4 on the temporal region 50 side, it is possible to prevent the string 21 of the mask 20 from interfering with the slit hole 8. In addition, in the sound collecting device 100, since the output unit is also built in the main body 1, by providing the string locking portion 4 on the temporal region 50 side, it is possible to prevent the string 21 of the mask 20 from interfering with the output unit.

Note that the sound collecting device 100 of the first embodiment may maintain ear protection and sound collection performance by providing a string locking portion having the same structure not only in the hearing aid but also in the main body of the sound collecting device that is constantly worn. In addition, by providing the string locking portion, there is an effect of making the mask be easily worn and removed. Moreover, by changing the shape of the string locking portion, a modern (tip cell), which is an ear hooking portion of glasses, may be locked, and the ear may be protected when wearing the glasses.

In the above-described first embodiment, switching of the sound output when the mask 20 is worn or not worn is performed by the operating unit 3, but the present disclosure is not limited thereto, and for example, switching of the sound output when the mask 20 is worn or not may be performed by operating a device such as a smartphone or a smart watch wirelessly connected to the sound collecting device 100 by Bluetooth (registered trademark) or the like.

The shape of the string locking portion 4 is not limited to the groove on the back surface 1*a* and may be a structure capable of locking the string 21. FIGS. 4A to 4D are bottom views of main bodies of sound collecting devices according to first to fourth modifications of the first embodiment.

Figure 4A:
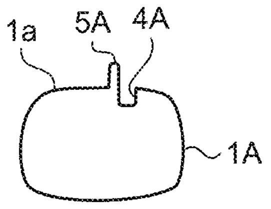
FIG. 4A is a bottom view of a main body of a sound collecting device according to a first modification of the first exemplary embodiment.

As illustrated in FIG. 4A, a string locking portion 4A according to the first modification includes a groove formed on the back surface 1*a* of a main body 1A and a protrusion 5A. The protrusion 5A is provided in parallel with the groove and is preferably provided closer to the helix 40 than the groove. The protrusions 5A may be formed on both sides of the groove. Due to the presence of the protrusion 5A, the mask string is more unlikely to deviate from the string locking portion 4A toward the helix 40, and the wearability is improved.

Figure 4B:
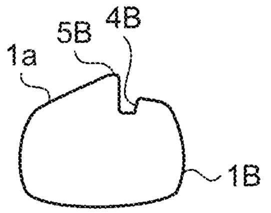
FIG. 4B is a bottom view of a main body of a sound collecting device according to a second modification of the first embodiment.

As illustrated in FIG. 4B, a string locking portion 4B according to the second modification includes a groove and a protrusion 5B formed on the back surface 1*a* of a main body 1B. The protrusion 5B is an inclination formed on the back surface 1*a* of the main body 1B.

Figure 4C:
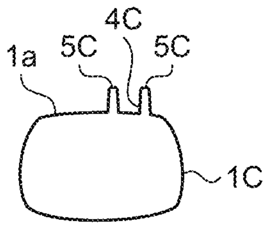
FIG. 4C is a bottom view of a main body of a sound collecting device according to a third modification of the first embodiment.

As illustrated in FIG. 4C, a string locking portion 4C according to the third modification includes two protrusions 5C provided in parallel and formed on the back surface 1*a* of a main body 1C.

Figure 4D:
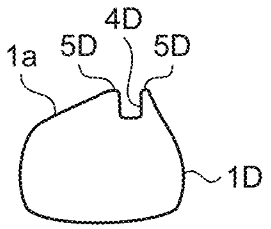
FIG. 4D is a bottom view of a main body of a sound collecting device according to a fourth modification of the first embodiment.

As illustrated in FIG. 4D, a string locking portion 4D according to the fourth modification includes two protrusions 5D provided in parallel and formed on the back surface 1*a* of a main body 1D. Each of the protrusions 5D is an inclination formed on the back surface 1*a* of the main body 1D.

Figure 5:
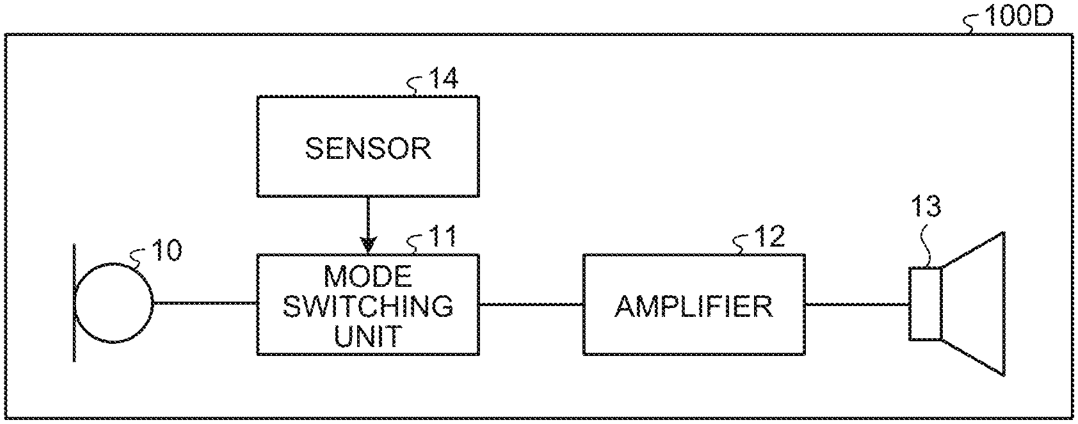
FIG. 5 is a block diagram of a sound collecting device according to a fifth modification of the first embodiment.

In addition, a sensor that determines whether or not the string 21 of the mask 20 is attached may be provided in the string locking portions 4, 4A, 4B, 4C, and 4D, and the sound output may be switched between when the mask is worn and when the mask is not worn. FIG. 5 is a block diagram of a sound collecting device according to a fifth modification of the first embodiment.

A sound collecting device 100D includes a sound collecting unit 10, a control unit (mode switching unit) 11, an amplifier 12, an output unit 13, and a sensor 14. In a case where the sound collecting device 100D and the mask 20 are simultaneously worn, the sound collecting unit 10 collects sound via the mask 20, and thus there is a problem in which the user's own voice is muffled. In the fifth modification, the sensor 14 is provided in the string locking portion, and the attachment of the mask 20 is detected by the sensor 14.

The sensor 14 is preferably provided at the bottom of the groove of the string locking portion, and for example, attachment of a mask may be detected by a mechanical button, a pressure sensor, or an optical sensor. The sensor 14 is preferably provided at a central portion of the string locking portion (central portion of the main body 1). Alternatively, a plurality of the sensors 14 may be provided in the string locking portion, and whether or not a mask is attached may be determined by integrating sensing results at a plurality of places. As a result, it is possible to more accurately prevent erroneous detection of mask attachment. Moreover, different types of sensors may be used in combination.

When detecting attachment of the mask 20, the sensor 14 notifies the mode switching unit 11 of the detection result. By the notification, the mode switching unit 11 switches a normal processing mode (first mode) in a case where the mask is attached to an attachment processing mode (second mode) in which the user's muffled voice when the mask is attached is cleared. In addition, when the sensor 14 detects detachment of the mask 20, the detection result is notified to the mode switching unit 11, and the mode switching unit 11 switches the attachment processing mode (second mode) when the mask is attached to the normal processing mode (first mode) when the mask is not attached.

By attaching the mask 20, the sound of 2000 to 7000 Hz among the conversation sounds is attenuated, the balance of the voice collected by the sound collecting unit is lost, and it becomes difficult to hear the sound. In the attachment processing mode (second mode), the frequency band cut by attaching the mask is amplified by sound signal processing, so that the sound is easy to hear free from a muffled state of the user's own voice. In the sound collecting device 100D, the mode switching unit 11 switches the processing mode, so that clear sound output may be performed even when the mask is attached.

Note that, in a case where the sound collecting devices 100D are worn on both ears, the detection result may be notified from the sensor 14 to the mode switching unit 11 when the string is attached to the string locking portion of one of the sound collecting devices 100D, and also in a case where the mask is detached, the detection result may be notified from the sensor 14 to the mode switching unit 11 when the string is detached from the string locking portion of one of the sound collecting devices 100D.

In the above-described fifth modification, switching is performed between the normal processing mode and the attachment processing mode by the notification from the sensor 14 to the mode switching unit 11, but the sensor 14 may notify a device such as a smartphone or a smartwatch wirelessly connected to each sound collecting device 100D by Bluetooth (registered trademark) or the like of the detection result and switch the sound output when the mask 20 is worn or not worn by operation of the device. For example, a switching screen may be displayed on a screen of the device, and the output may be switched based on operation of the user.

Second Embodiment

Figure 6:
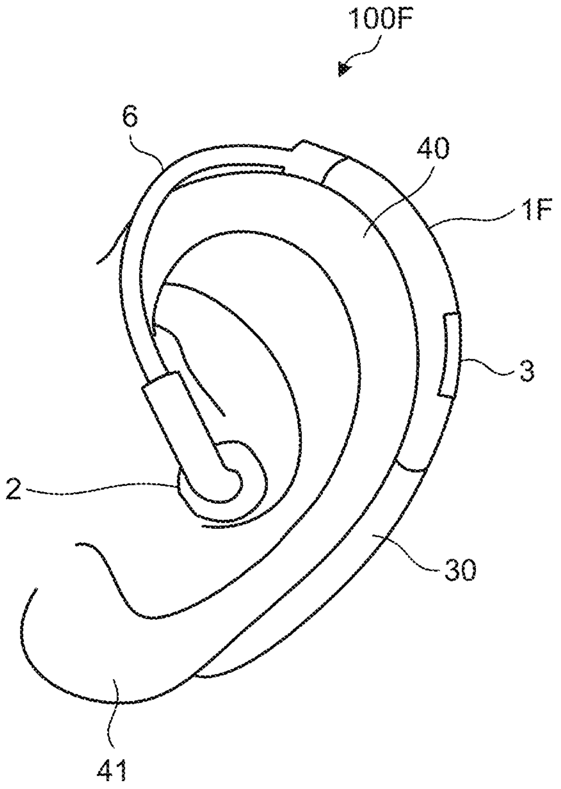
FIG. 6 is a view illustrating a schematic configuration of a sound collecting device according to a second embodiment.
Figure 7:
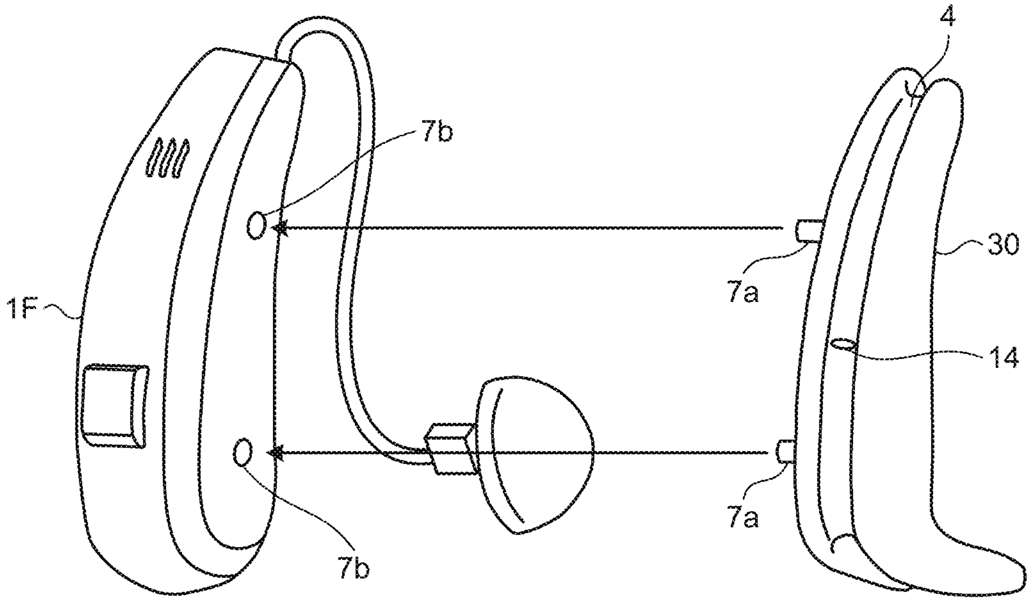
FIG. 7 is a view for describing attachment of an ear protection member of the sound collecting device of the second embodiment to a main body.
Figure 8:
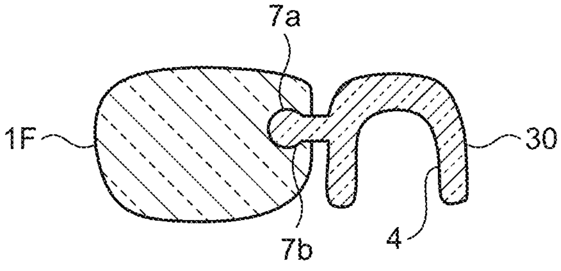
FIG. 8 is a cross-sectional view of the second embodiment.

In a sound collecting device 100F according to a second embodiment, an ear protection member 30 having the string locking portion 4 is detachably attached to a main body 1F. FIG. 6 is a view illustrating a schematic configuration of the sound collecting device according to the second embodiment. FIG. 7 is a view for describing attachment of the ear protection member of the sound collecting device of the second embodiment to the main body. FIG. 8 is a cross-sectional view of the second embodiment. In the configuration of each unit of the second embodiment, the same components as those of the first embodiment are denoted by the same reference numerals, the description thereof is omitted, and only different points will be described.

The sound collecting device 100F includes the main body 1F, the ear plug portion 2 (transmission unit), and the ear protection member 30 detachably attached to a side of the main body 1F in contact with a temporal region and having the string locking portion 4 having a groove shape. A string of a mask is locked in the string locking portion 4 of the ear protection member 30.

The ear protection member 30 may be attached to the main body 1F by fitting a fitting portion 7*a* provided on the ear protection member 30 side into a female fitting portion 7*b* provided on the main body 1F side. If the ear protection member 30 has a shape that may be worn alone in the gap between the helix and the temporal region, it is not always necessary to provide fitting portions in the main body 1F and the ear protection member 30. In addition, the male and female shapes of the fitting portions may be opposite to those of the example of FIG. 7 on the main body 1F side and the ear protection member 30 side.

The size of the ear protection member 30 is preferably set to a length that comes into contact with an earlobe 41 from the main body 1F, and the string of the mask may be prevented from touching the ear or the temporal region by making the ear protection member 30 larger than the main body 1F. The same applies to other embodiments.

The ear protection member 30 is preferably made of an elastic body, for example, silicon. By configuring the ear protection member 30 with an elastic body, generation of rubbing sound due to the string of the mask is suppressed, and a fit feeling when the string is in contact with the ear and the temporal region is improved. In addition, since the ear protection member 30 is detachably attached to the side of the main body 1F in contact with the temporal region, it is possible to prevent the string 21 of the mask 20 from interfering with the sound collecting unit. The same applies to other embodiments.

In the sound collecting device 100F, the sensor that detects attachment of a mask may be provided in the string locking portion 4, and switching may be performed between the normal processing mode (first mode) in a case where the mask is not attached and the attachment processing mode (second mode) in which the user's muffled voice when the mask is attached is cleared. In such a case, the detection result from the sensor may be transmitted to the mode switching unit in the main body 1F via the fitting portions 7*a* and 7*b*. The mode switching is not limited to the mode switching in response to the detection of mask attachment in the string locking portion 4, and the mode switching may be performed in response to the connection of the fitting portions 7*a* and 7*b*.

Similarly to the first embodiment, the sound collecting device 100F of the second embodiment may maintain ear protection and sound collection performance by attaching the ear protection member 30 having the same structure not only to the hearing aid but also to the main body of the sound collecting device that is constantly worn. In addition, the mask may be easily worn and removed by providing the ear protection member 30. Moreover, by changing the shape of the ear protection member, a modern (tip cell), which is an ear hooking portion of glasses, may be locked, and the ear may be protected when wearing the glasses.

The present disclosure may also have the following configurations.

(1) A sound collecting device including: a main body including a sound collector inside of the main body, the sound collector being mounted in a gap between a helix and a temporal region, a string locking portion; and a transmitter configured to transmit sound information generated by the main body.

(2) The sound collecting device according to (1), wherein the string locking portion is disposed on a side of the temporal region of the main body.

(3) The sound collecting device according to (1), wherein the string locking portion includes a groove.

(4) The sound collecting device according to any one of (1) to (3), further including: a sensor provided in the string locking portion and configured to detect whether or not a mask is worn; and a controller configured to switch a sound output between a first value for wearing the mask and a second value for not wearing the mask.

(5) The sound collecting device according to (4), wherein the sensor is configured to detect contact of a mask string.

(6) The sound collecting device according to (5), wherein the sensor is a button or a pressure sensor.

(7) The sound collecting device according to (1), wherein the string locking portion is configured to be attached to or detached from the main body via a fitting portion.

(8) The sound collecting device according to (7), further including a sensor provided in the string locking portion and configured to detect whether or not a mask is worn, wherein a signal detected by the sensor is transmitted to the main body via the fitting portion.

(9) The sound collecting device according to (1), wherein the string locking portion has a length at least in contact with an earlobe from the main body.

(10) The sound collecting device according to (1), wherein the string locking portion is made of an elastic body.

According to the present disclosure, even when a sound collecting device and a mask are simultaneously used, it is possible to protect an ear and improve sound collection performance.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A sound collecting device comprising:
- a main body including
  - a sound collector inside of the main body, the sound collector being mounted in a gap between a helix and a temporal region,
  - a string locking portion;
- a sensor provided in the string locking portion and configured to detect contact of a mask string to determine whether or not a mask is worn;
- a controller configured to switch a sound output between a first value for wearing the mask and a second value for not wearing the mask; and
- a transmitter configured to transmit sound information generated by the main body.

2. The sound collecting device according to claim 1, wherein the string locking portion is disposed on a side of the temporal region of the main body.

3. The sound collecting device according to claim 1, wherein the string locking portion includes a groove.

4. The sound collecting device according to claim 3, wherein the string locking portion further includes a protrusion provided adjacent to the groove.

5. The sound collecting device according to claim 1, wherein the sensor is a button or a pressure sensor.

6. The sound collecting device according to claim 5, wherein the sensor is an optical sensor.

7. The sound collecting device according to claim 1, wherein the string locking portion is configured to be attached to or detached from the main body via a fitting portion.

8. The sound collecting device according to claim 7, wherein
- a signal detected by the sensor is transmitted to the controller via the fitting portion.

9. The sound collecting device according to claim 7, wherein the string locking portion is part of an ear protection member that is detachably attached to the main body.

10. The sound collecting device according to claim 9, wherein the ear protection member includes an elastic body to suppress rubbing sounds from a mask string and improve a fit feeling.

11. The sound collecting device according to claim 1, wherein the string locking portion has a length at least in contact with an earlobe from the main body.

12. The sound collecting device according to claim 1, wherein the string locking portion is made of an elastic body.

13. The sound collecting device according to claim 1, wherein the controller is configured to, when switching to the first value, amplify a frequency band of sound collected by the sound collector that is attenuated by the mask.

14. The sound collecting device according to claim 13, wherein the frequency band is between 2000 Hz and 7000 Hz.

15. The sound collecting device according to claim 1, wherein the controller is further configured to switch the sound output between the first value and the second value based on a signal received from a wireless remote device.

16. The sound collecting device according to claim 15, wherein the wireless remote device is a smartphone or a smartwatch.

17. The sound collecting device according to claim 1, wherein the main body includes an operating portion configured to receive a manual input to switch the sound output between the first value and the second value.

18. The sound collecting device according to claim 1, wherein a plurality of sensors are provided in the string locking portion, and the controller is configured to determine that the mask is worn based on integrated sensing results from the plurality of sensors.

19. The sound collecting device according to claim 1, wherein the string locking portion is further configured to lock an ear hooking portion of a pair of glasses.

20. The sound collecting device according to claim 1, wherein, upon detecting the contact of the mask string, the controller switches from a normal processing mode to an attachment processing mode in which a user's muffled voice is cleared.

* * * * *